March 10, 1964 A. VOGINI 3,124,176
ADJUSTABLE JIG FOR CUTTING WOOD
Filed Sept. 14, 1961 3 Sheets-Sheet 1
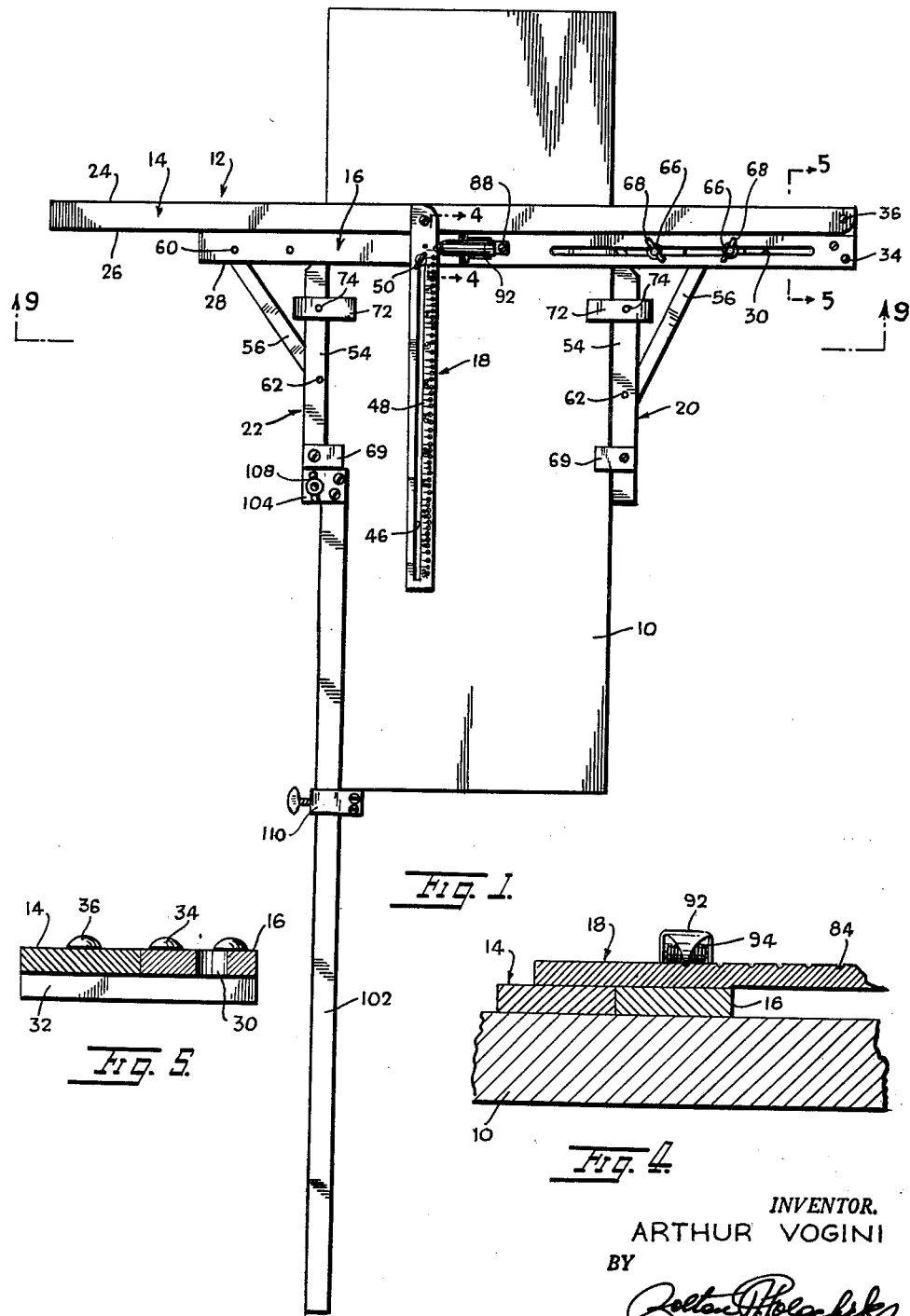
INVENTOR.
ARTHUR VOGINI
BY
ATTORNEY

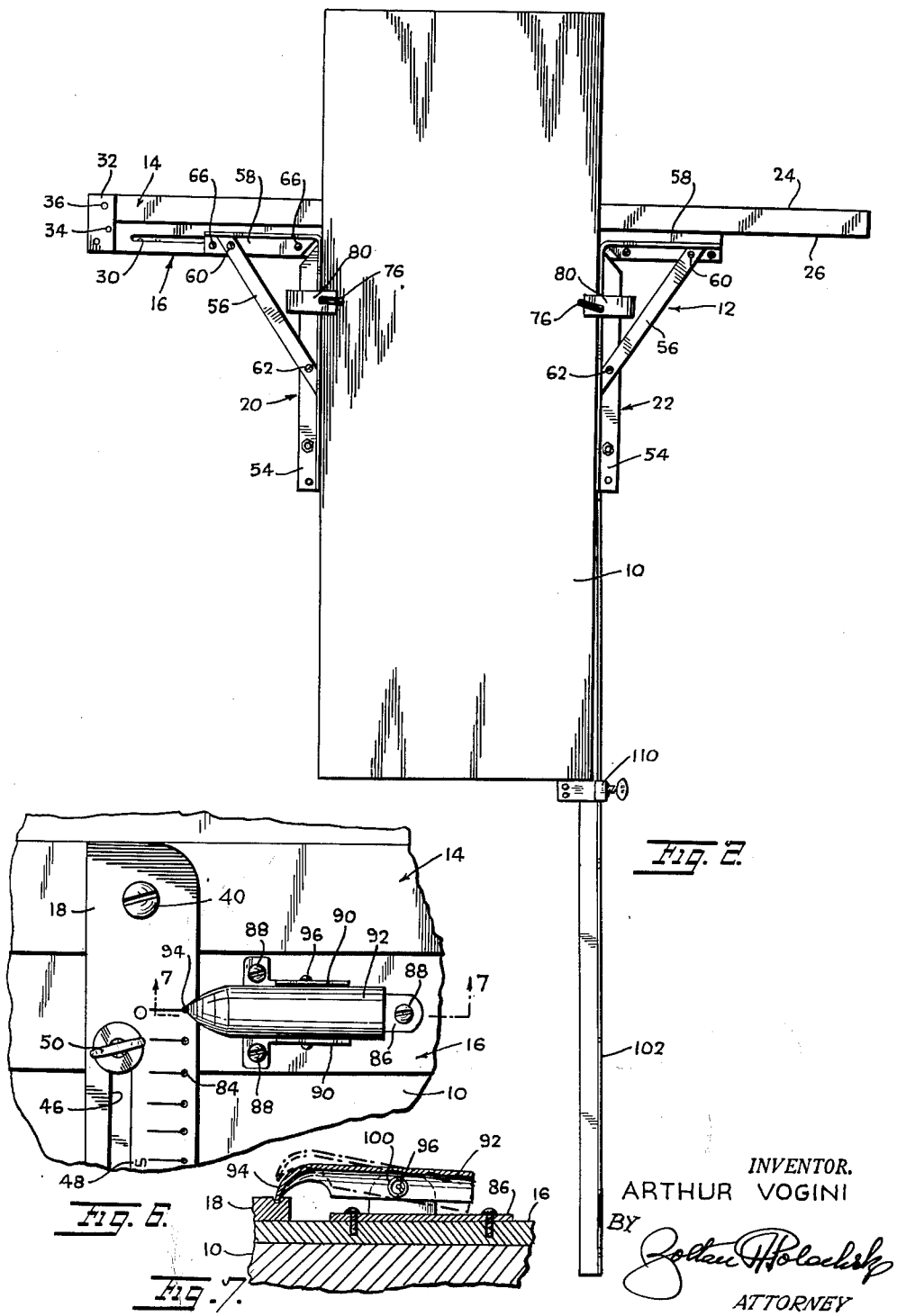

March 10, 1964  A. VOGINI  3,124,176
ADJUSTABLE JIG FOR CUTTING WOOD
Filed Sept. 14, 1961  3 Sheets-Sheet 3

INVENTOR.
ARTHUR VOGINI
BY
*Zoltan Holochek*
ATTORNEY

United States Patent Office 3,124,176
Patented Mar. 10, 1964

3,124,176
ADJUSTABLE JIG FOR CUTTING WOOD
Arthur Vogini, 23—42 31st Road, Long Island City, N.Y
Filed Sept. 14, 1961, Ser. No. 138,084
1 Claim. (Cl. 143—6)

This invention relates to a combined square and guide device for portable power driven saws.

Power handsaws are used extensively for cutting wood and other materials. The power saw comprises a housing in which an electric motor is mounted and the motor in turn is operatively connected to the saw blade. In some instances the housing is supported on a flat frame, platform or bed on which the saw rests. With a power saw it is desirable to have a guiding means during the cutting operation to effect greater accuracy and this invention is primarily concerned with this guiding means. Many devices have heretofore been used for guiding power operated saws, but such devices have been complicated and the cost prohibitive.

It is accordingly a primary object of the present invention to provide a guide for power handsaws that will greatly increase their usefulness and accuracy without detracting from their normal use.

Another object of the invention is to provide a guide for power handsaws that is not affixed to the saw and is simple in construction, light in weight and easily affixed to the work for a cutting operation.

A further object of the invention is to provide a guide for power saws in which the guide is positioned to rest upon the material to be cut and in which one portion of the guide will rest against one side of the material which is the guiding edge to thus maintain the guide in position for a cutting operation.

A specific object is to provide a combination square and power saw guide having a movable guide arm whereby the arm may be set at a preselected angle with respect to the saw guide and the arm selectively locked in place at a predetermined angle, without the necessity of laying out the particular angle.

A still further object of the invention is to provide an adjustable guide for power operated handsaws in which means are provided to pivotally support the guide to guide the power saw in a predetermined angular cut while bracing the guide against displacement by the power handsaw.

Yet another object is to provide a saw guide which includes a straight edge against which the base of power saws can be rested and guided along a true and straight line.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a top plan view of a power handsaw guide embodying my invention shown in position on a board, the guide being shown in closed position.

FIG. 2 is a bottom plan view thereof.

FIG. 3 is a fragmentary top plan view thereof showing the guide in open adjusted position.

FIG. 4 (Sheet 1) is an enlarged sectional view taken on the line 4—4 of FIG. 1.

FIG. 5 is an enlarged sectional view taken on the line 5—5 of FIG. 1.

FIG. 6 is an enlarged top plan detail view showing the mechanism for locking the guide bar in adjusted position.

Figure 7:
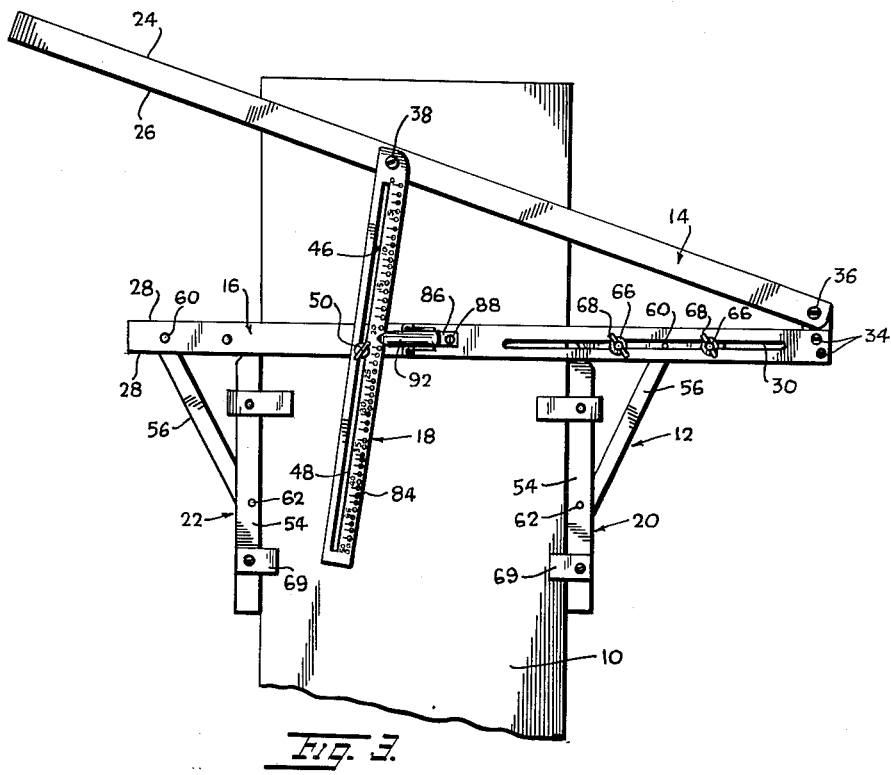
FIG. 7 is a sectional view taken on the line 7—7 of FIG. 6.

Referring in detail to the drawings, in FIG. 1 a combined square and guide for power handsaws embodying my invention is shown in operative position on a wooden board or timber 10 to be cut and is designated generally by the reference numeral 12.

The combined square and saw guide is preferably formed of aluminum, magnesium, plastic, steel or other thin section metal or the like. Such material presents a tool which is light in weight and which can be readily handled.

The combined square and saw guide comprises broadly five elements, to wit, 14, 16, 18, 20 and 22, element 14 being the main guide track for the saw. Element 14 is an elongated rectangular flat metal bar positioned with its bottom surface resting upon the board 10 to be cut and having straight edges 24 and 26 along both the outer long edge and the inner long edge, respectively. The outer straight edge 24 is the guiding edge for the base of the power saw. The bar extends on both sides of the board 10.

Elements 16 and 20 constitute the square. The element 16 is an elongated rectangular flat metal bar positioned with its bottom surface resting upon and disposed across the board 10 and extending laterally on both sides of the board. The bar 16 has straight edges 28, 28 along both long sides thereof. An elongated closed slot 30 is formed adjacent one end thereof. A short rectangular plate 32 (FIG. 5) extends across one end of the bars 14 and 16, connecting said bars. The end of bar 16 is fastened to one end of the plate 32 by screws 34 and the end of bar 14 is pivotally secured to the other end of the plate 28 by means of a pivot screw 36. The pivoted end of bar 14 is slightly rounded to facilitate pivoting action thereof.

Element 18 constitutes a protractor or calibrated reading bar and is perfectly rigid and flat with an aperture 38 (FIG. 3) at one end thereof to permit a setscrew 40 (FIG. 6) to be passed through aperture 38 and threaded into an aperture in element 14 to thus retain element 18 in a pivoted relation to element 16. Bar 18 is provided with an elongated closed slot 46 extending substantially the length of the bar. On one side of the slot, the surface of the bar is calibrated in degrees as indicated at 48. A wing bolt 50 passes loosely through the slot 46 and is threaded into an aperture in the bar 16.

Figure 8:
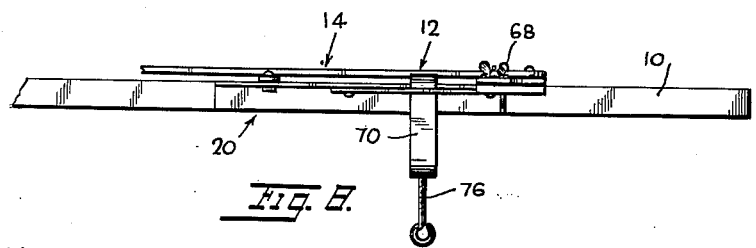
FIG. 8 is an edge view looking from the right-hand side of FIG. 3.
Figure 9:
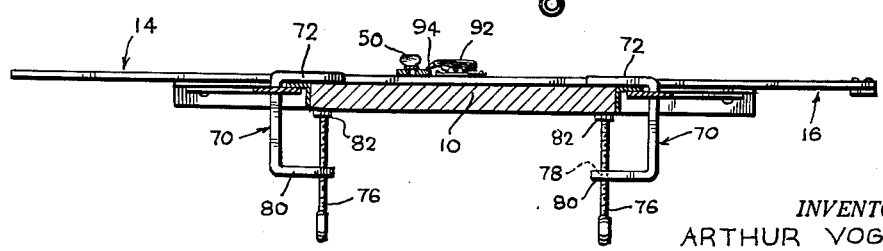
FIG. 9 is a cross-sectional view taken on the line 9—9 of FIG. 1.

Element 20 in addition to constituting part of the square also serves with element 22 as a clamping device to clamp the combined square and saw guide to the board 10. Each of the elements 20 and 22 consists of an angle iron 54, L-shaped in configuration. A flat brace bar 56 extends across the space between the base of the angle iron and the right angular leg 58 thereof and is secured in position by screws 60 and 62. The right angular leg 58 of angle iron 54 of element 20, however, with the angle iron, is slidably connected to the other slotted end of bar 16 by means of threaded bolts 66 extending through apertures in leg 58 and passing loosely through the slot 30 in the bar 16. Wing nuts 68 on the ends of the bolts hold the element 22 in moved adjusted position along the bar 16. A radial flat tongue 69 extends laterally of the free end of each of the bases of the clamping devices 20 and 22 and serves as a guide for positioning each clamping device against the long edge of the board 10. The clamping devices 20 and 22 are removably fastened to the long side edges of the board 10 by means of a pair of C-shaped clamps 70 (FIGS. 8 and 9), one leg 72 of each clamp being fastened to the adjacent angle iron 54 by a screw 74 (FIG. 1). A wing bolt 76 extends through a hole 78 in the other leg 80 of each clamp 70 and is formed with a head 82 on its inner end adapted to engage the bottom surface of the board 10 thereby clamping the combined square and guide 12 to the board.

The calibrations in degrees from 0 to 50 on the bar 18 are indicated by short transverse lines with shallow recesses 84 at the outer ends thereof. In accordance with the invention, means is provided for adjusting the parts and holding them at the angle desired to cut the board 10. For this purpose, a plate 86 (FIGS. 6 and 7) is secured flatwise against the bar 16 by screws 88 intermediate the ends thereof. The plate 86 is formed with two spaced side outstanding perforated ears 90, 90 at the center of the length thereof. A pointer 92 channel-shaped in configuration and cross section with a pointed hook 94 on one end thereof, is pivotally mounted by means of a pivot pin 96 extending through aligned openings in the sides thereof and through the perforated ears 90, 90. The pointed hook 94 extends over the edge of the bar 18 and a coil spring 100 on the pivot pin 96 urges the hook 94 into the recesses 84 on the bar 18 thereby indicating the degree of angularity desired. The wing bolt 50 is then set upon for holding the bars 16 and 18 in moved adjusted position.

In accordance with the invention, an elongated angle iron 102 (FIGS. 1 and 2) has one end detachably fastened to the angle iron 54 of the clamping device 22 by means of a cross plate 104 secured to said end of the angle iron 102, the plate 104 extending laterally of the angle iron and having a central hole therein. The perforated end of plate 104 overlaps a right angular leg of the angle iron 54 and is detachably secured thereto by a wing bolt 108. The angle iron 102 serves as an extension of the clamping device 20 and one of its right angular legs is adapted to contact the long edge of the board 10 which mounts the clamping device 22. An angular gauge or stop device 110 is slidably mounted along the angle iron 102. With the length of the board 10 to be cut known, the gauge or stop 110 may be set to the correct length along the angle iron and the entire number of boards for the job may be cut quickly, accurately and precisely at a single setting of the saw.

In operation, before using the combined square and saw guide of the present invention, the angle of cut desired must be known and the wing bolt 50 loosened and pointer 92 tilted away from the bar 18. The bar 14 is then swung to the required calibration as indicated by the pointer 92 on the bar 18. The protruding end of the bar 14 serves as a handle for this purpose. The wing bolt 50 is again tightened against the bar 18. A board with straight sides and of the desired length as indicated by gauge 110 is selected and the square and guide device is applied thereby by positioning the board between the clamping devices 20 and 22 and against gauge 110. During this operation, the clamping device 20 may be moved laterally to permit boards of various widths to be received between the clamping devices. The wing bolts 76 of clamps 70 are then set up against the surface of the board, clamping the square and guide device to the board for a specific cutting operation. The base of the portable power saw (not shown) is moved along the outside straight edge 24 of guide bar 14 thereby making a perfectly clean straight cut.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A combination square and saw guide for use with a portable power driven saw comprising, an elongated rectangular fixed flat bar with opposed long straight side edges, said fixed bar having a threaded recess intermediate its ends, an L-shaped bar with straight edges along its base and with its angle leg connected to the fixed bar adjacent each end thereof so that the base of the L-shaped bar and the fixed bar form a right angle, an elongated flat rectangular saw guide bar with opposed long straight side edges pivotally connected to the distal end of said fixed flat bar, an elongated reading bar pivotally connected to the pivoted guide bar intermediate its ends, said reading bar having indicia on one surface thereof representing degrees, said reading bar having a central elongated closed slot extending therealong and spaced recesses in the surface of the reading bar at the ends of the indicia, a wing bolt extending through the slot in said reading bar and threaded into the recess in the fixed bar to hold the movable guide bar in adjusted angular position relative to the fixed flat bar, and a pointer pivotally mounted on the fixed bar and extending over the reading bar and adapted to engage in said recesses for precisely locating certain angular settings and for holding the reading bar in moved position, an elongated angle iron detachably connected at one end to the distal end of the base of the L-shaped bar and forming an extension of said L-shaped bar, and a gauge slidably mounted on the detachable angle iron for gauging the length of the wooden board to be cut.

References Cited in the file of this patent

UNITED STATES PATENTS

| | | |
|---|---|---|
| 867,927 | Potter | Oct. 8, 1907 |
| 2,014,229 | Emmons | Sept. 10, 1935 |
| 2,651,333 | Spinney | Sept. 8, 1953 |
| 2,735,455 | Forsberg | Feb. 21, 1956 |
| 2,772,707 | Leino | Dec. 4, 1956 |
| 2,773,523 | Hopla | Dec. 11, 1956 |
| 2,823,709 | Konieczka | Feb. 18, 1958 |
| 2,959,199 | Naumann | Nov. 8, 1960 |

FOREIGN PATENTS

| | | |
|---|---|---|
| 934,789 | Germany | Nov. 3, 1955 |